United States Patent [19]

Morimoto

[11] Patent Number: 4,806,885

[45] Date of Patent: Feb. 21, 1989

[54] MAGNET-ELECTRO-OPTIC EFFECT LIGHT MODULATOR

[75] Inventor: Takeshi Morimoto, Kyoto, Japan

[73] Assignee: Sumitomo Electric Industries, Ltd., Osaka, Japan

[21] Appl. No.: 81,672

[22] Filed: Aug. 5, 1987

[30] Foreign Application Priority Data

Aug. 8, 1986 [JP] Japan ............................. 61-186660

[51] Int. Cl.$^4$ ............................ G02F 1/09; H04B 9/00
[52] U.S. Cl. ................................. 332/7.51; 350/373; 350/378
[58] Field of Search ........................ 332/7.51; 330/4.3; 357/17, 27; 372/12, 27, 43; 350/373, 378

[56] References Cited

U.S. PATENT DOCUMENTS

| | | |
|---|---|---|
| 3,247,765 | 4/1966 | Cocca et al. |
| 3,580,664 | 5/1971 | Bongers et al. |
| 3,899,430 | 8/1975 | Johnson ............................ 332/7.51 |
| 4,027,948 | 6/1977 | Tanton et al. ...................... 350/378 |
| 4,450,460 | 5/1984 | Morimoto . |

FOREIGN PATENT DOCUMENTS

| | | |
|---|---|---|
| 0132139 | 7/1984 | European Pat. Off. |
| 132139A | 1/1985 | European Pat. Off. |
| 2285628 | 5/1976 | France ............................. 350/378 |
| 61-27920 | 6/1986 | Japan . |
| 480036 | 12/1975 | U.S.S.R. |

OTHER PUBLICATIONS

Morimoto et al., "Characteristics of . . . Diode", J. Appl. Phys., Part 2, vol. 23, #11, pp. L821-823, 11/84, abst. only.

Morimoto et al., "Induced Absorption . . . Temperatures," Phys. Lett., vol. 110A, #9, pp. 473-476, 8/19/85.

Morimoto et al., "Light Amplification . . . InSb", Phys. Lett., vol. 104A, #1, pp. 55-58, 8/6/84.

Berman et al., "Luminescence of Hot Holes . . .," Fig. & Tekh., Poluprovadn, vol. 19, #3, pp. 369-377, 3/85, abst. only.

Lavallard et al., "Saturation of Optical . . . Crystals,"

Phys. Rev. B., vol. 16, #6, pp. 2804-2810, 9/15/77, abst. only.

Sorahin et al., "Standard Measures . . . of the Spectrum", Meas. Tech., vol. 22, #2, pp. 138-139, 2/79, Abst Only.

Little et al., "High-Resolution Magneto-Optical . . . ", Phys. Rev. B., vol. 27, #12, pp. 7473-7488, 6/15/83, Abst. Only.

Morimoto et al., "D/Sup-2/Thickness . . . Diode," JPN J. Appl. Phys., Part I, vol. 25, #2, pp. 289-296, 2/86, Abst.

Applied Optics, vol. 25, No. 12, Jun. 15, 1986, "Temperature-Stable Faraday Rotator Material and Its Use in High-Performance Optical Isolators", pp. 1940-1945, S. Matsumoto et al.

(List continued on next page.)

Primary Examiner—Nelson Moskowitz
Attorney, Agent, or Firm—Cushman, Darby & Cushman

[57] ABSTRACT

A magneto-electro-optic effect light modulator has a rectangular solid-like semiconductor element made of one member selected from the group of an n-type semiconductor, a p-type semiconductpr and an intrinsic semiconductor. The semiconductor element has no pn-junction and has a band-gap corresponding to the energy of infrared light concerned. Also provided are a magnet for applying a magnetic field H to the semiconductor element and electrodes for passing an electric current through the semiconductor element access the magnetic field. A power source supplies an electric current passing through the semiconductor element in order to modulate the light incident upon the semiconductor element. An entrance polarizer disposed in front of the semiconductor element linearly polarizes the infrared-light transmitting therethrough. An exit polarizer disposed behind the semiconductor element linearly polarizes the infrared-light transmitting therethrough, the exit polarizer has a polarization plane different form the entrance polarizer. The light modulator utilizes the population inversion causd by a cooperation of current J and magnetic field H to modulate the light incident upon the semiconductor element.

6 Claims, 4 Drawing Sheets

OTHER PUBLICATIONS

High-Efficiency Modulator for Infrared Laser Beams by Inter-Valence Band Transition in Germanium, Umeno et al., pp. 68–69, Department of Electronics. Nagoya University, Nagoya, Japan.

Springer Series in Solid-State Sciences, vol. 71: High Magnetic Fields in Semi-Conductor Physics, "Population Inversion and Anomalous Voight Effect Due to J×H Force in InSb", Morimoto et al., Institute of Atomic Energy, pp. 470–471.

MAGNET-ELECTRO-OPTIC EFFECT LIGHT MODULATOR

BACKGROUND OF THE INVENTION

The present invention relates to a light modulator for modulating intermediate infrared-light. In particular, the present light modulator utilizes population inversion caused by a cooperation of both the current flow and the magnetic field for modulating light.

In optical communication systems, light modulators, as well as light sources, transmitting media, light detectors, etc. have become important elements. Light having a wavelength from 0.8 to 1.5 $\mu$m can be modulated by means of internal modulation using light-emitting-diodes or laser diodes which have been developed so far. The term "modulation" is used herein in the broadest sense to include modulating any properties of light in general, not always limited to intensity modulation, phase modulation, frequency modulation, etc. The development of low-loss optical fibers has made the use of light in the wavelength range from 0.8 to 1.5 $\mu$m for communication possible. The light having such a wavelength is, however, heavily attenuated in the atmosphere, so that near-infrared or visible light can not be employed as the carrier in optical communication systems using the atmosphere as the transmitting medium.

Infrared light of a wavelength from 8 to 14 $\mu$m is hardly attenuated in the atmosphere. Therefore, much attentions have been paid to light having a wavelength from 8 to 14 $\mu$m as a useful frequency band for wireless optical communication systems using the atmosphere as the transmitting medium. The $CO_2$ laser is one of the light sources meeting such a requirement on the wavelength, which is also able to emit light of various wavelengths. The light having a wavelength of 10.6 $\mu$m is particularly suitable for that purpose because of its ease in producing a high powered beam as well as the excellent quantum efficiency. The $CO_2$ laser has been developed for other purposes, such as for machining and for medical treatments, and therefore, it is technically accessible. But, no matter how excellent a light source may be, it can not be used for optical communications without appropriate light modulators. Heretofore, suitable light modulators working at this wavelength range have not been available. Accordingly, light having a wavelength of 8–14 $\mu$m could not be used in optical communications heretofore.

In optical communication systems, light modulation is an important means by which audio and other informations are "carried" by the light wave. The light wave, in effect, acts as a carrier wave. Modulation of light can be achieved either by external modulation using a modulator or by internal modulation which is effected by the operation of the light source itself However, it is difficult to modulate internally a $CO_2$ laser itself or the like. Hence, some external modulators are needed.

Modulation may be achieved by appropriately changing the physical properties of the modulator itself. The modulation effected by electrical means is especially regarded as ideal, since it has an excellent in high-speed response.

As the conventional types of modulator, the devices using Kerr effect, Pockels effect, Faraday rotation and the like, have been known. The Kerr effect is a phenomenon wherein the refractive index of the modulating medium varies in proportion to the square of the applied electric field. The Kerr cell using the above Kerr effect has been used as a modulator. The Pockels effect is a phenomenon wherein the refractive index of a modulating medium varies in proportion to the applied electric field. The Faraday rotation is a phenomenon wherein the plane of polarization of light is rotated in proportion to the magnetic field applied to the direction of propagation of light. Actually, the light modulation is made by changing the strength of the magnetic field and by changing the current passing through the exciting coil Thus, although the Faraday modulator utilizes a magneto-optic phenomenon, the electric current is the real means for the modulation.

As described above, modulators using an electro-optic effect as well as a magneto-optic effect have already been realized. However, those modulators are merely used for the modulation of visible and near-infrared lights. Those modulators cannot be used for modulating light of longer wavelengths than 2$\mu$m because there are no materials which are transparent enough at that wavelength range and also exhibit useful electro-optic or magneto-optic effects.

Regarding the infrared region of wavelengths from 2 to 22 $\mu$m, a modulator using a pn-junction of Ge has been proposed so far. The free-carrier absorption in Ge is proportional to the number of free carriers. With the change in the forward voltage applied to the pn-junction, the number of free electrons injected from the pn-junction increases or decreases, so that the light absorption will correspondingly increase or decrease. This enables us to make an intensity modulation using the change in the light absorption. However, this method has a serious disadvantage due to its large absorption-loss. It has a further disadvantage in that the response speed is not fast. Undoubtedly, the absorption-modulation method involving Ge has found few practical utilities.

In view of this, it is easy to understand why the infrared-light modulators, effective at the infrared region of wavelengths longer than 2 $\mu$m, have not previously existed. The disadvantage of absorption loss is especially apparent at the light modulation using a 10.6 $\mu$m $CO_2$ laser; the incident light is so powerful that such a modulator having high absorption-loss can not be used because of the possible damage and destruction due to the heating up.

J$\times$H Force

Hereinafter, the term 'J$\times$H force' (also known as the Lorenz Force) will often be used, wherein J represents current density and H represents magnetic field. The interaction of J, H and light in a crystal is utilized in the present invention, and hence the term 'J$\times$H force' has a significant meaning representing the interaction.

To the best of our knowledge, no light modulators heretofore have made use of the effect of the J$\times$H force. Thus, the wording of 'J$\times$H force' does not only articulate briefly the operational principle of the present invention, but also expresses its novelty, and, therefore, the effect produced by the J$\times$H force is called "magneto-electro-optic effect".

Magneto-electro-optic Effect

The term 'electro-optic effect' already has a well-defined meaning in the art. However, the term 'magneto-electro-optic effect' is a new term defined by the inventor as will be explained hereinafter.

In the Faraday effect, the directions of propagating light and the applied magnetic field are parallel to each other, and the plane of polarization of light is rotated through the propagation. This effect is obviously different from the magneto-electro-optic effect herein described.

The Voigt effect occurs when the direction of the propagating light is perpendicular to that of the applied magnetic field. In this case, the wave number of the "ordinary mode" (being defined below) becomes different from the wave number of the "extraordinary mode" (defined below), so that a phase difference results between the two modes. Hence, an intensity modulation could be achieved by using the effect together with a suitable polarizer, although the efficiency is very weak.

"Ordinary mode" refers to when the electric-field vector, $E_{rf}$, of light is parallel to the magnetic field. In this mode, the vector is not directly affected by the applied magnetic field. There exists an "extraordinary mode" when the electric-field vector of light has the component perpendicular to the applied magnetic field. In this mode, the vector is directly affected by the applied magnetic field. Electrons and positive holes make cyclotron motions in a plane perpendicular to the magnetic field, so that the effective dielectric constant varies depending on the applied magnetic field.

Since a phase difference is obtained between the two modes in the application of magnetic field, it seems that the effect may be utilized as a light modulator. However, this is not true. Even though a strong magnetic field is applied, the phase difference is too small to be utilized as a practical modulator. There is a limit in the strength of the applied magnetic field for its practical use, no matter how effective it may be.

The Voight effect pertains to the interaction of light with magnetic field in the configuration, $k \perp H$, where k is the wave number vector of light. The inventor came up with an idea, as set forth hereinafter, of passing a high current J through the materials perpendicularly to both the magnetic field and the light propagation direction, i.e., in the configuration, $k // J \times H$, $J \perp k$, and $J \perp H$, in which k is the wave-number vector of light representing also the propagation direction.

The Hall effect is used in general for determination of the carrier concentrations in materials: the voltage, V, induced across the plane perpendicular to both J and H is measured by passing a current J perpendicularly to the magnetic field. It is evident that there exist no light waves in the Hall effect. In order to distinguish from the Voight effect, the present inventor refers to the phenomenon concerning the present invention as "magneto-electro-optic effect"; it refers to the phenomenon that the physical properties of the incident light is affected by the $J \times H$ force as propagating through electron-hole plasmas supported by semiconductors. In this case the $J \times H$ force plays an essential role, instead of the magnetic field H in the Voight effect.

However, on the usage of the above terminology we must pay some attention to avoid confusion, since the present inventor has already succeeded in realizing a light-emitting diode and light-amplifying, laser diodes in the same configuration of $J \perp H$ using the same material (InSb), and called the phenomenon concerning the invention "magneto-electric-photo effect". As set forth, in the same configuration of $J \perp H$, the use of the same material for composing a light-amplifyer, a laser diode as well as a light-emitting diode has been known heretobefore, however, the principle for light modulation based on a population inversion due to the $J \times H$ force as proposed here has never been reported.

Infrared-Emitting (Laser) Diode

The material used by the inventor as the typical example is a single crystal of InSb known heretofore as an infrared material. Various types of laser diode have been produced or proposed. Light-emitting diodes and laser diodes can be made of semiconductors of Group III—Group V compounds such as GaAlAs, GaP, InP and the like. Each emits only the light of wavelengths from visible to the near-infrared region; any practical semiconductor lasers working at room temperature and capable of emitting infrared light of wavelengths longer than 2 $\mu$m do not exist hereunto.

The inventor conceived that intrinsic InSb crystals might be used for composing a semiconductor diode (laser), through the excitation of electrons and positive holes by the action of $J \times H$ force without using any p-n junction. Japanese Patent No. 1359409 (Jan. 30, 1987) relates to such an InSb semiconductor diode (laser) disclosed by the present inventor. In this device, a strong magnetic field is applied to the single crystal, and a current is passed perpendicularly to the magnetic field. Then electrons and positive holes are driven to the direction perpendicular to both the magnetic field H and the current J. Assume the direction of the drift to be the y-coordinate axis, then the population of electrons and positive holes will increase near the one surface perpendicular to the y-coordinate axis and decreases near the opposite surface. In other words, the population of electrons and positive holes is not uniform but increases along the y-coordinate axis.

As the number of electron-hole pairs increases, the recombination takes place accompanied with light emission. If the recombination radiation takes-place in-phase at the limit of high excitation, we may have a laser diode. The emission becomes either spontaneous or stimulated corresponding to the extent of the excitation. Anyway, the device can function as a light-emitting diode. In said Japanese Patent No. 1359409, the device has been named "magneto-infrared-emitting diode". However, the naming may be somewhat incorrect, because in this device a bulky InSb single crystal itself is used, but no pn-junction is used.

The population of electrons and positive holes is increased deviating from the thermal equilibrium values by applying the $J \times H$ force to the InSb single crystal. The pumping energy comes from the power supply, but the electric current has quite a different role from the current passing through the pn-junctions of the conventional light-emitting diodes.

In the case of gas lasers or solid lasers, the laser action is caused by the inter-level transitions of electrons. The population in an upper level is increased by some excitation, and the population in a lower level is decreased, resulting in 'population inversion'. Here, each "level" means the energy-levels of electrons in isolated atoms.

In the case of semiconductor lasers, the interlevel transition of electrons is not utilized but the interband recombination of electrons and positive holes is utilized. A current is passed through the pn-junction in the forward direction thereby injecting minority carriers so as to bring radiative recombination of excess electrons and positive holes. Although this state is rarely referred to as "population inversion", but in a sense it can be regarded as a substantial "population inversion".

It may be considered that the said magneto-infrared-emitting diode realizes a population inversion in a bulky InSb single crystal through the action of the $J \times H$ force. The narrow band-gap of InSb (0.23 eV) is appropriate for obtaining an infrared emission of wavelength ~5.3 μm, and we can compose an infrared-light-emitting device using it.

An injection-type InSb laser diode in which the excitation (injection) is made by current passing through the pn-junction has already been proposed. However, because of the narrow band-gap such an injection-type InSb laser does not work unless the device is cooled down to very low temperatures. At the earlier stage, all laser diodes were operated only intermittently at low temperatures, and had no practical utilities until the continuous lasing at room temperature became feasible in 1971.

Even though a monochromatic light having a wavelength longer than 2 μm could be obtained by using an InSb pn-junction type diode, the practical utilities must be limited by the operational temperature as low as 4.2 K. However, the present inventor has demonstrated that the pumping by use of J×H force is useful for realizing a laser diode, using a bulky InSb crystal, which functions at higher temperatures.

Infrared-Light-Amplifier

After realizing an infrared-light-emitting device by applying the J×H force to an InSb single-crystal, the present inventor attempted to compose a light amplifier using the same material.

Unequilibrium population of electrons and positive holes along the direction perpendicular to both J and H, is caused in the InSb single-crystal by the J×H force. The number of electrons and positive holes in the vicinity of one surface is increased so much, and ultimately the number thereof reaches as hundreds of times as the value in the thermal equilibrium state, when highly excited, resulting in a population inversion.

By passing through the inverted population region, the incident light, having a wavelength corresponding to the band gap, can be amplified by means of a successive stimulated emission: when the inverted population is realized the population of electrons and holes becomes highly degenerate, so that the absorption of the incident light occurs no longer and only the stimulated emission takes place, thus resulting in the multiplication of photons concerned. In the strict sense the energy of the incident photons, hω, must satisfy the relation as given by eq. (44) hereinafter in order to be amplified.

The allowed energy-width for the incident photons is so narrow, and hence the materials composing the active medium in the light amplifier should be selected suitably according to the wavelength of the incident light: the tunability for the wavelength expected from varying the strength of the magnetic field will be at most 10% in the field strengths up to 10 Tesla.

J×H Force Semiconductor Device

Hereunto the principles of semiconductor laser and light amplifier using the J×H force have been described. Although InSb crystal has been employed as an example, any semiconductors can be employed so long as the band-gaps are narrow enough to fit with the infrared region. For example, materials which can be employed are HgCdTe, PbSnTe, PbSnSe, BiSb, InAs and the like. Except for InAs all other materials are mixed crystals and the band-gaps can be shifted by changing the mixture ratio.

The present inventor has proposed composing semiconductor lasers by use of these materials. Since the principle does not involve the use of a pn-junction, it is not needed necessary to equip any pn-junctions. Thus, these semiconductor lasers can be composed even from semiconductors for which fabricating the pn-junctions is difficult. Furthermore, the band-gap, $E_g$, can be changed by selecting the material. In other words, infrared semiconductor lasers having a wide range of wavelengths can be obtained.

This type of semiconductor lasers are loser is pumped by the J×H force, so that the internal modulation can be made by changing J or H. Therefore, the intensity modulation of the output of the semiconductor laser is easily achieved by modulating J. However, whatever materials are selected, all values of the band-gap energy are not always obtained. Consequently, all light can not always be freely modulated, even if the wavelength is limited to a region from 2 to 20 μm.

As set forth, the present inventor has proposed a light amplifier utilizing the J×H force. Since all amplifiers could be regarded as a kind of intensity modulator, it may also be used as an intensity modulator. In this case, however, the wavelength available for the modulation is limited to a wavelength being amplified in the material, which is roughly given in the following equation (1). Thus, the utility as an intensity modulator is seriously constrained.

As is well known, the central wavelength, $\lambda_o$, of the emission generated by the interband recombination in the material having a band-gap energy, $E_g$, is given by $$\lambda_o(\mu m) \simeq \frac{1.24}{E_g(ev)} \qquad (1)$$

Thus, the wavelength to be amplified or modulated by the inverted population is roughly determined by equation (1) for given band-gap energy, $E_g$, of the materials concerned.

For convenience in practical use, the construction of an infrared-light modulator working at wider range of the wavelengths and at room temperature is strongly required. For example, if $CO_2$ laser light could be modulated at high speed, the various practical applications must be developed.

SUMMARY OF THE INVENTION

A magneto-electro-optic effect light modulator has a rectangular solid-like semiconductor element made of one member selected from the group of n-type semiconductors, p-type semiconductors and intrinsic semiconductors. The semiconductor element has no pn-junction and has a band-gap corresponding to the energy of the infrared-light concerned. Also provided are a magnet for applying a magnetic field H to the semiconductor element and electrodes for passing an electric current through the semiconductor element across the magnetic field. A power source is equipped to pass an electric current through the electrodes for modulating light incident upon the semiconductor element. An entrance polarizer is disposed in front of the semiconductor element in order for linearly polarizing the infrared light transmitting therethrough. An exit polarizer is disposed behind the semiconductor element for linearly polarizing the infrared light transmitting therethrough, the exit polarizer has a polarization plane different from the entrance polarizer.

The present invention provides a light modulator which effectively modulates infrared light having a wavelength longer than 2 μm. More specifically, it operates effectively in the wavelength range of 8–14

μm. The modulator provides high speed response which is suitable for optical communication systems. It functions in wide temperature range, from low temperatures to room temperature, that is, from about absolute zero to 300 K.

The present invention has the following advantages:

(1) Light modulation of infrared light is possible.

(2) New avenues of application is opened for wireless optical communications using infrared light of a wavelength of 8-14 μm or higher.

(3) $CO_2$ laser light of a wavelength of 10.6 μm can be modulated. Since $CO_2$ lasers have been widely used, further applications for $CO_2$ lasers are available.

(4) A semiconductor element having no pn-junctions is used and the semiconductor device can operate at room temperature despite of its narrow band-gap.

(5) The light modulator is not the absorption type and is useful for modulating weak light-signal.

(6) The light modulator has a function of amplifying light at higher frequency, making it possible to modulate the incident light of very weak intensity.

DETAILED DESCRIPTION OF THE PREFERRED EMBODIMENT

Figure 1:
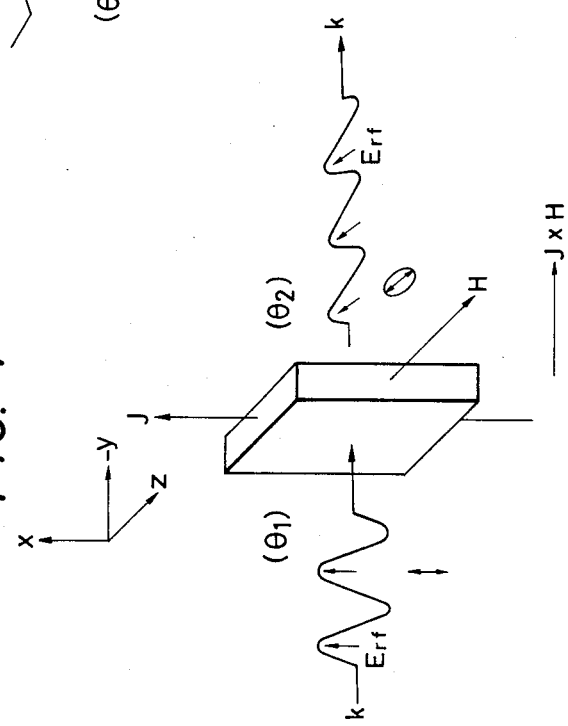
FIG. 1 is a perspective view for explaining the action of J×H force in a semiconductor, which brings the transmitting light to rotate the plane of polarization, according to the present invention.

Referring to FIG. 1, the principle of the light modulator according to the present invention is shown. A plate-like semiconductor sample is made of a material sufficiently transparent for infrared light. The direction of a normal line perpendicular to a surface of the sample is denoted as Y, the longitudinal direction is chosen as x, and the other horizontal direction is chosen as z. A magnetic field H is applied along the z-direction. A current flow, of current density J, is passed along the x-direction. Incident light is transmitted from the +y plane to the −y plane of the sample. The electric field vector of light is denoted as $E_{rf}$. Even if the incident light is linearly polarized, the transmitted light will become elliptically polarized.

In general, light having the electric field, $E_{rf}$, parallel to H is called 'ordinary mode' and, in this mode H exhibits no influence. On the other hand, light having the electric field component parallel to the x-direction, i.e., perpendicular to H, is called 'extraordinary mode', and in this mode the influence of H is substantial. The wave number of the ordinary mode is denoted as $k_o$, and the wave number of the extraordinary mode is denoted as $k_e$. When the magnetic field H is applied, the wave numbers become different with the two modes. The difference ($k_o - k_e$) therebetween is proportional to the square of the magnetic field H, and the phenomenon is called the Voight effect.

The idea of the present inventor is to extend it so as to involve a current J, but let us first begin the theoretical treatment of the Voight phase-shift, δ, for the case of J=0.

The Voight-phase shift, δ, per unit path is defined as the phase difference between the two modes caused when propagating by unit distance, and is given by $$\delta = k_o - k_e \quad (2)$$

Electrons and positive holes move under the influence of the electromagnetic field of light. With respect to the ordinary mode, the electric field $E_{rf}$ has only the z-component parallel to the applied magnetic field H, so that the influence of H can be neglected. Suppose that electrons move collectively along the z-coordinate axis and the displacement from the equilibrium position is expressed as z.

When a net displacement of z exists, the depolarization electric field $E_d$ will arise. Let polarization, electric charge, and electron density be denoted as P, e (plus), n ($cm^{-3}$), respectively, then the following relations hold;

$$P = -nez, \quad (3)$$

$$E_d = -4\pi p, \quad (4)$$

and a restoring force ($-eE_d$) will work on the electron.

Let $\tau$ be the relaxation time of electrons through the collision and m be the electron mass, then we have the equation of motion;

$$m\ddot{z} + m\frac{\dot{z}}{\tau} + 4\pi e^2 nz = -eD. \quad (5)$$

In equation (5), the second term containing the relaxation time of electrons, $\tau$, expresses the resistance force against the electron motion. The third term expresses the restoring force produced by the collective or plasma motion of electrons. D represents the density of electric flux, and is defined as $$D = \epsilon E_d. \quad (6)$$

D vibrates with the same angular frequency $\omega$ as of the incident light.

The stationary solution of (5) can be easily found using a simple assumption that the depolarization force owing to the plasma motion is strong enough to neglect the second term. Then, it follows from (5);

$$z = \frac{eD}{m} \frac{1}{\omega^2 - \omega_p^2}. \quad (7)$$

From (7), polarization P can also be found, in a form $$\frac{(\epsilon - \epsilon_\infty)E}{4\pi} = P. \quad (8)$$

In (8), $\epsilon_\infty$ represents the dielectric constant of the sample in the limit of high frequency.

From equations (3), (7) and (8), we have the dielectric constant $\epsilon$ as $$\epsilon = \epsilon_\infty \left(1 - \frac{\omega_p^2}{\omega^2}\right). \quad (9)$$

In equation (9), $\omega_p$ is the plasma frequency as given by $$\omega_p^2 = \frac{4\pi n e^2}{m \epsilon_\infty}. \quad (10)$$

Heretobefore we have considered only the motion of electrons, and so equation (9) is varid merely for electrons. While, the plasma frequency of positive holes, $\omega_q$, is found in a similar form to equation (10), replacing the carrier concentration n and the effective mass m by the corresponding values.

When electrons and positive holes coexist, $\epsilon$ may be expressed by the following equation (11) instead of (9);

$$\epsilon = \epsilon_\infty \left(1 - \frac{\omega_p^2}{\omega^2} - \frac{\omega_q^2}{\omega^2}\right). \quad (11)$$

Here, $\omega$ is the angular frequency of incident light, which is much higher than the plasma angular frequencies $\omega_p$ and $\omega_q$ for electrons and positive holes.

Equation (9) expresses an idealized dielectric constant for a free electron gas in a certain substance which is making a plasma motion, and is frequently used because of the simplicity.

Heretofore we have considered the electron motion induced by the electric field of light polarized along the z-direction. In this case, the dielectric constant is merely modified by the plasma motion of electrons and includes no effect of magnetic fields.

Next, let us consider the extraordinary mode having the electric-field component, $E_{rf}$, parallel to the x-direction. This mode is affected by the Lorentz force because of $E_{rf} \perp H$ in this configuration. (Assume also that $J = 0$ in FIG. 1) The motion of electrons will now be in the xy-plane parpendicular to H.

Let x and y be the coordinates of electrons, then neglecting collisions, the equation of motion of an electron relative to the x-coordinate is $$m\ddot{x} + 4\pi e^2 n x - \frac{e}{c}\dot{y}H = -eD, \quad (12)$$

where the third term represents the Lorentz force, and c is the light velocity. The Lorentz term has a minus sign, because e is defined as a positive quantity.

Although the density of electric flux is expressed simply as D on the right sides of (5) and (12), it should be understood as follows: D in (5) represents the z-component of the density of electric flux, whereas D in (12) represents the x-component. For simplicity, these components of the density of electric flux are used without suffix.

The equation of motion of an electron relative to the y-coordinate is written as $$m\ddot{y} + 4\pi e^2 n y + \frac{e}{c}\dot{x}H = 0. \quad (13)$$

Here, the right side of equation (13) is zero, because the y-component of the density of electric flux D vanishes for the incident light traveling along the y-direction.

For the light having a angular frequency $\omega$, the time variation of D can be expressed as $D_0 \sin\omega t$ in equation (12). Furthermore, using the following complex representation (14), $$w = x + iy, \quad (14)$$

equations (12) and (13) can be rewritten as $$m\ddot{w} + 4\pi e^2 n w + \frac{e}{c} i\dot{w}H = -eD_0\sin\omega t. \quad (15)$$

Now, the stationary solution of (15) can be obtained as follows. Since w oscillates in the form of $\sin\omega t$, the left side of equation (15) can be rewritten as $$(-\omega^2 + \omega_p^2)\sin\omega t + i\Omega_c\omega\cos\omega t, \quad (16)$$

where $\Omega_c$ is the cyclotron frequency given by $$\Omega_c = \frac{eH}{mc}. \quad (17)$$

The stationary solution of (15) has the following form $$w = A\sin\omega t + B\cos\omega t. \quad (18)$$

Substituting the solution (18) into (15), we have $$A\{(-\omega^2 + \omega_p^2)\sin\omega t + i\Omega_c\omega\cos\omega t\} + \quad (19)$$
$$B\{(-\omega^2 + \omega_p^2)\cos\omega t - i\Omega_c\omega\sin\omega t\} = -eD_0\sin\omega t.$$

Comparing the coefficients of $\sin\omega t$ and $\cos\omega t$, it is found that $$B = \frac{i\omega\Omega_c}{\omega^2 - \omega_p^2} A. \quad (20)$$

Substituting this into (19), we obtain $$A\left\{(-\omega^2 + \omega_p^2) + \frac{\Omega_c^2 \omega^2}{\omega^2 - \omega_p^2}\right\} = -eD_0. \quad (21)$$

The following definitions (22), (23) and (24) should also be varied in the same way as the preceding;

$$P = -nex, \quad (22)$$

$$P = \frac{\epsilon - \epsilon_\infty}{4\pi} E, \quad (23)$$

$$D = \epsilon E. \quad (24)$$

Thus, the following expression (25), for the dielectric constant $\epsilon$, is derived from the definitions;

$$\epsilon = \epsilon_\infty \left\{ 1 - \frac{(\omega^2 - \omega_p^2)\omega_p^2}{\omega^2(\omega^2 - \omega_p^2 - \Omega_c^2)} \right\}, \tag{25}$$

which is merely applicable for electrons though.

The contribution from positive holes should now be considered. Denoting the cyclotron angular frequency of the positive holes as $\Omega_d$, we can wright the final expression of the dielectric constant for electron-hole system as follows:

$$\epsilon = \epsilon_\infty \left[ 1 - \frac{(\omega^2 - \omega_p^2)\omega_p^2}{\omega^2(\omega^2 - \omega_p^2 - \Omega_c^2)} - \frac{(\omega^2 - \omega_q^2)\omega_q^2}{\omega^2(\omega^2 - \omega_q^2 - \Omega_d^2)} \right]. \tag{26}$$

Here the 3rd term in the bracket represents the contribution from holes.

For non-magnetic materials, there is well known dispersion relation connecting the wave number k and the angular frequency ω as follows;

$$k^2 = \frac{\omega^2}{c^2} \epsilon. \tag{27}$$

The wave number $k_0$ of ordinary light can be expressed as follows using $\epsilon$ as given by (11);

$$k_0^2 = \left(\frac{\omega}{c}\right)^2 \epsilon_\infty \left(1 - \frac{\omega_p^2}{\omega^2} - \frac{\omega_q^2}{\omega^2}\right). \tag{28}$$

The wave number $k_e$ of extraordinary light can also be expressed as follows, using (26) and (27) as well as assuming $\omega >> \omega_p, \omega_q, \Omega_c, \Omega_d$;

$$k_e^2 \simeq \left(\frac{\omega}{c}\right)^2 \epsilon_\infty \left[1 - \frac{\omega_p^2}{\omega^2 - \Omega_c^2} - \frac{\omega_q^2}{\omega^2 - \Omega_d^2}\right]. \tag{29}$$

Thus, we may have the Voight phase-shift, $\delta$, per unit path as defined by equation (2), expanding the roots of equations (28) and (29);

$$\delta = k_o - K_e = \frac{\sqrt{\epsilon_\infty}}{2c\omega^3}(\omega_p^2\Omega_c^2 + \omega_q^2\Omega_d^2). \tag{30}$$

The first term on the right side on equation (30) arises from electrons and the second term arises from positive holes, indicating that the effects of both carriers are additive. In (30) the electron density is included in the plasma frequency and the influence of the magnetic field is included in the cyclotron frequency.

The wave number of extraordinary mode decreases in proportion to the square of the magnetic field, so that the phase-shift, $\delta$, per unit path becomes increases proportionally to the square of the magnetic field. The above equation (30) is a general formula for the Voight effect applicable for the electron-hole system in semiconductors.

As set forth hereunto the phase velocities, ω/k, for both ordinary and extraordinary modes are different, so that a phase difference between the two modes arises at the exit surface. Though the incident light is linearly polarized, the plane of polarization becomes rotated because of the phase difference while the incident light passes through the semiconductor sample, making the transmitted light elliptically polarized.

Hereunto the angular frequency of light ω has been assumed to be higher than the plasma angular frequency $\omega_p$. Furthermore, in order for light to propagate through the crystals without absorption, the following relation (31) must be satisfied;

$$E_g > n\omega > n\omega_p. \tag{31}$$

The inequality set forth is what is assumed in the ordinary Voight effect in semiconductors.

The semiconductor concerned may be of either n-type or p-type, or it may be intrinsic:type (n=p).

In the general expression (30), the plasma angular frequencies for electrons and holes can be written as the following equations (32) and (33); for electrons $$\omega_p^2 = \frac{4\pi n e^2}{m_1 \epsilon_\infty}, \tag{32}$$

where $m_1$ is the effective mass of electrons, and n the concentration of electrons, and for holes $$\omega_q^2 = \frac{4\pi p e^2}{m_2 \epsilon_\infty}, \tag{33}$$

where $m_2$ is the effective mass of holes, and p the concentration of positive holes.

For compensated electron-hole plasmas having an equal number of electrons and holes, putting n=p and using the relations (17), (32), (33), etc., in equation (30) we have $$\delta = \frac{2\pi n e^4 H^2}{\sqrt{\epsilon_\infty} \, c^3 \omega^3} \left[ \left(\frac{1}{m_1}\right)^3 + \left(\frac{1}{m_2}\right)^3 \right]. \tag{34}$$

This formula indicates that the Voight phase-shift is proportional to the square of the magnetic field H. In most cases, the value of $\delta$ is so small, compared with the Faraday rotation, that the Voight phase-shift can not be used directly for practical applications. However, under the condition, n=p, the Faraday rotation vanishes as mentioned heretobefore.

In the present invention, a high current J is passed perpendicularly to both the magnetic field H and the wave-vector, k, of the incident light so as to enhance the Voight effect. Then, there arises two effects from the addition of current J.

(1) Given that the incident light is propagating along the (−y)-direction in parallel with the J×H force and electrons and positive holes are driven also to the (−y)-direction with the same drift velocity $v_d$, then, the angular frequency, ω, of the light sensed by the electrons and positive holes must be shifted to $\omega' = \omega \pm kv_d$ by the Doppler effect. Herein, for the light satisfying $\omega > \omega_p$, the relation $\omega >> kv_d$ yields. Then, the shift quantity is so small that it can be entirely neglected.

(2) Another effect of the J×H force is that the carrier concentration is increased remarkably by the force.

Let n be the concentration of electrons, then the Lorentz force acting on an electron is given by $$f = \frac{JH}{nc}. \tag{35}$$

This force acts on electrons so as to drive them to the $(-y)$-direction, and this force is related to a vector potential for electrons moving along the $(-y)$-direction. The pseudo potential may be expressed as the following;

$$\psi = -\frac{JH}{nc}\left(y - \frac{d}{2}\right). \tag{36}$$

Here d is the thickness of the sample, and the points $y = \pm d/2$ are taken to designate both the entrance and the exit faces for the light.

The situation is the same for positive holes. When $n \sim p$, positive holes are also driven to the $(-y)$-direction. At $y = -d/2$, both concentrations of electrons and holes take the maximum values, as a result of the change in the population due to the action of the Lorentz force, although this does not mean any change in the band-gap energy.

As described above, by application of a strong $J \times H$ force the generation of electron-hole pairs takes place. With respect to positive holes, the same potential as expressed by (36) will be induced in the y-direction.

In the quasi thermal equilibrium state, the electron concentration n(y) can be approximately expressed by the following equation (37);

$$n(y) = N_0 \exp\left(-\frac{E_g - \psi}{2kT}\right), \tag{37}$$

where k is the Boltzmann constant and T the temperature. Equation (37) can be rewritten as $$n(y) = \tilde{N}_0 \exp\left(\frac{-JH(y - d/2)}{2kTnc}\right). \tag{38}$$

In equations (37) and (38), $N_0$ and $\tilde{N}_0$ are constants. For the concentration of holes p(y), we can obtain the similar expression.

In the thermal equilibrium state, the electron concentration $n_0$ and the concentration of positive holes $P_0$ must satisfy the following relation (39) with respect to the intrinsic carrier concentration $n_i$ of the semiconductor;

$$n_0 P_0 = n_i^2(T) \tag{39}$$

However, in the vicinity of one surface at $y = -d/2$, the carrier concentrations are much increased deviating from the thermal equilibrium values satisfying (39), because of the influence of the $J \times H$ force as described before. In this case, the relationship being satisfied by these hot carriers must be $$np > n_i^2, \tag{40}$$

instead of (39).

Figure 2:
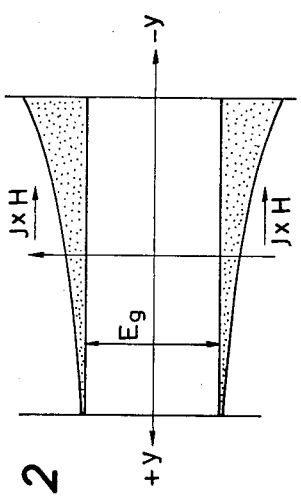
FIG. 2 is a schematic illustration of the population of the conduction electrons and positive holes excited by the J×H force, when they are slightly degenerate.

FIG. 2 shows schematically the variation of the carrier population, being slightly degenerate, under the influence of the $J \times H$ force acting along the $(-y)$-direction, in an intrinsic InSb sample, in which reabsorption of the emission as well as absorption of the background photons are taking place near the rear surface at $y = d/2$ so as to compensate the decrease in the number of electron-hole pairs near the rear surface.

In this way, the carrier concentrations are increased by the action of $J \times H$ force. However, the discussion set forth hereunto is valid only for the case of weak excitation overall the range satisfying, $|y| \sim |d| >> l^*$, $l^*$ being the ambipolar diffusion length. While, in the case of high excitation using very strong $J \times H$ force, as shown later, the valence to conduction bonds breakthrough does take place during the free passage of electrons by distance, $\Delta y < \sim l^*$, and this plays an essential role on the present invention through the sharp increase in the effective carrier concentrations.

In the case of high excitation, the interband breakthrough is taking place at every passage of electrons by, $|\Delta y| \sim l^* << d$, being much smaller than the width d, and so the carrier population will sharply vary only in the region, $\Delta y \sim l^*$, and the carrier population seems rather to be smooth and flat from a view point of course-scale averaging overall the sample, different from the tapered population as shown in FIG. 2.

Although having the analytical expression for the effective carrier concentration $n^*$ is difficult when the multiplication takes place through the interband breakthrough, the value could be evaluated from the voltage-current characteristics as shown hereinafter. Therefore, in the present case we can merely replace the electron concentration n by the effective concentration $n^*$ in equation (34), and then we have the expression for the Voight phase-shift per unit path under the influence of the $J \times H$ force;

$$\delta = \frac{2\pi n^* e^4 H^2}{\sqrt{\epsilon_\infty} c^3 \omega^3}\left[\left(\frac{1}{m_1}\right)^3 + \left(\frac{1}{m_2}\right)^3\right]. \tag{41}$$

Here, it is to be noted that the phase-shift $\delta$ can be increased up to the extent of values available for the practical use through the increase in the value of $n^*$ by the electromagnetic excitation due to the $J \times H$ force, whose action is implicitly included in $n^*$.

In equation (41), the controllable variables are current density J and magnetic field H, and the phase-shift $\delta$ increases proportion to the square of the magnetic field H.

Figure 6:
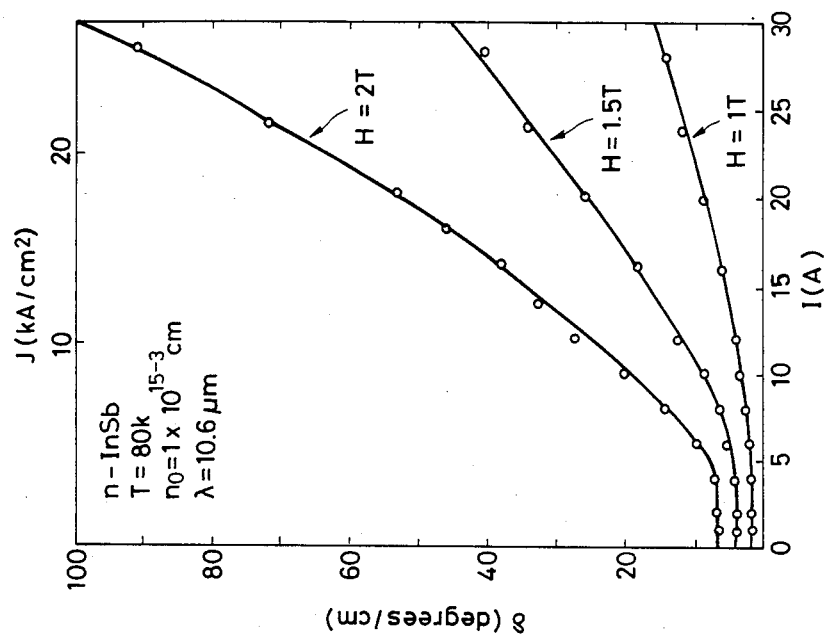
FIG. 6 is a graph similar to FIG. 5, except that the experimental temperature is changed to 80 K.
Figure 5:
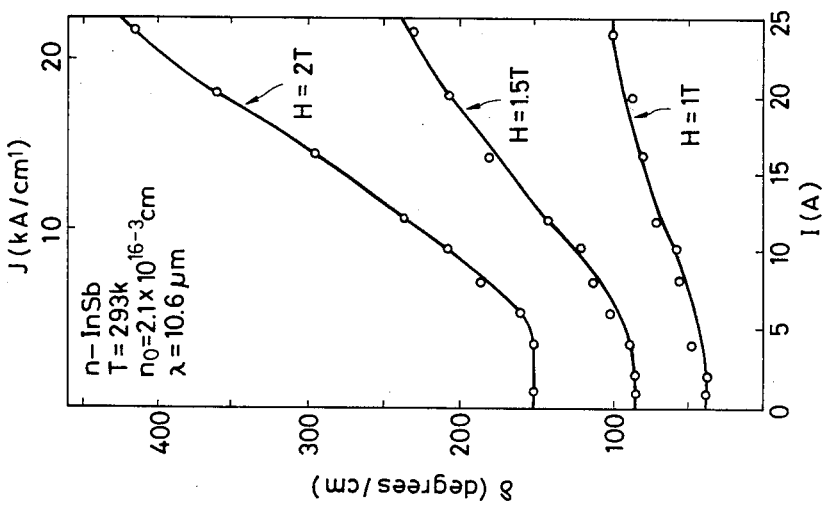
FIG. 5 is a graph view of the experimental result of n-type InSb at 293 K, showing the relationship of the phase-shift, δ, per unit length vs. the current density J for
H=1,1.5 and 2 T, when a $CO_2$ laser light having a wavelength of 10.6 μm is transmitting along the direction of J×H force in the configuration of J⊥H.

FIGS. 5 and 6 are instances showing the relationship of the current I and the phase-shift $\delta$ for given magnetic fields H. It will be apparent from the drawings that the phase-shift $\delta$ is proportional to the square of the magnetic field H. Here, the only controllable variable is actually the current density J, although J is implicitly contained in $n^*$ in equation (41).

The relationship between $n^*$ and J is not so simple and complicated. However, even if the theoretical relationship between $n^*$ and J is unknown, the relationship between J and $\delta$ can still be determined from the experiments as shown in FIGS. 5 and 6.

The following two characteristics, (1) V-I curves and (2) $\delta$-I curves, were examined by passing high currents J through an n-type InSb single-crystal sample subjected to high magnetic fields H at temperatures 80 and 293 K. The InSb sample was shaped in a rectangular solid and was set up as shown in FIG. 1. The dimension was 4 mm in length (x-direction), 0.55 mm in width (z-direction) and 0.2 mm in thickness (y-direction). In order to pass the current flow along the x-direction, 0.1 mm silver lead-wires were spot-welded to the yz-planes (top and bottom faces) by a condensor discharge, and excellent ohmic contact was obtained.

The electron concentration $n_0$ and the Hall mobility $\mu$ of the sample at 77 K were $1\times 10^{-}$cm$^{-3}$ and $3\times 10^5$ cm$^2$/Vs, respectively. The corresponding values at 293 K (room temperature) were, respectively, $n_0=2.1\times 10^{16}$ cm$^{-3}$ and $\mu=6.1\times 10^4$ cm$^2$/Vs.

The relationship between the voltage drop across the y-z planes, V, and the current density, J (// the x-direction). were measured for given magnetic fields of H=0, 0.5, 1 and 2 T. The measurements were made by use of constant current pulses to avoid the heating up of the sample. The pulse width was 2 $\mu$s and the repetition rate was 40 Hz. The results at 80 K are shown in FIG. 3.

At current densities lower than several kA/cm$^2$ all the V-I curves indicate the ohmic characteristics, although the resistance increases with the increasing magnetic fields reflecting the effect of the magneto-resistance. However, notable nonlinear characteristics are observed at higher currents.

In the case of H=0, the voltage-current characteristic indicates a Zener-type breakthrough such that at currents higher than $\sim 15$A the current is increased without increasing the voltage applied to the sample, i.e., it indicates that $\partial V/\partial I\sim 0$. However, under the application of high magnetic fields, the V-I curves indicate notable negative resistance such that $\partial V/\partial I<0$, as seen in FIG. 3. The negative resistance was first disclosed by the present inventor and has been reported in a paper by T. Morimoto and M. Chiba: in High Magnetic Fields in Semiconductor Physics, Springer Series in Solid-State Physics 71, Ed. G. Landwehl (Springer-Verlag, Berlin, 1987) p. 470.

Figure 3:
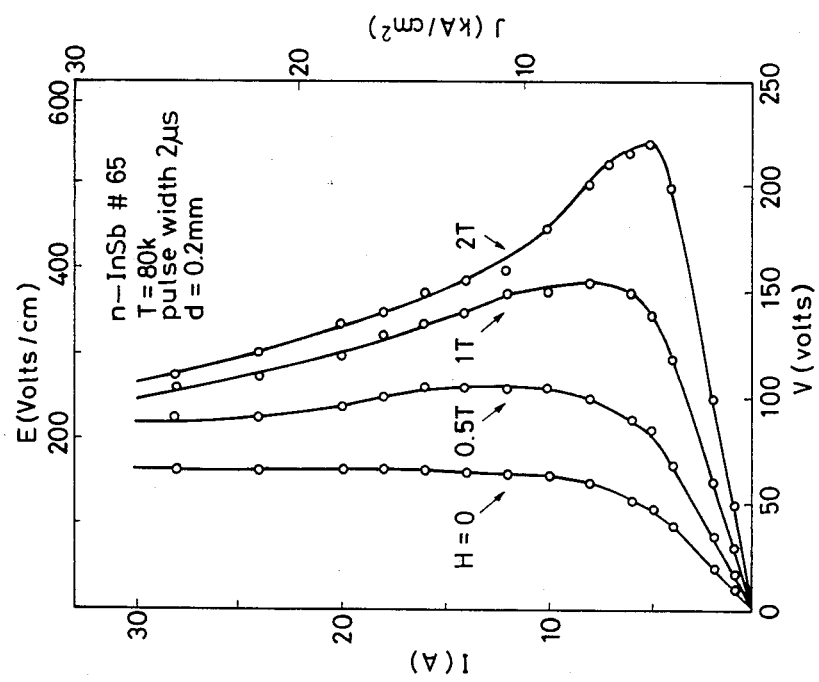
FIG. 3 is a graph showing the experimental results at 80 K of the current (I)-voltage (V) characteristics, for given magnetic fields of H=0, 0.5, 1 and 2 Tesla, in an n-type InSb single-crystal sample. The current density J is perpendicular to the magnetic field H.

According to the inventor, the negative resistance as seen in FIG. 3 is caused by sharp increase in the carrier number through the valence to conduction bands breakthrough which may arise when the condition $$\frac{J_c H}{n^* c} \cdot l^*(H) \simeq E_1 \qquad (42)$$

is satisfied at high currents and high magnetic fields.

In condition (42), $E_1=(3/2)E_g$ is the ionization energy of electron-hole pairs and $J_c$ is the critical current density at which dE/dJ=0. It is seen from FIG. 3 that the values of $J_c$ are 4.5 kA/cm$^2$ for H=2T, 7 kA/cm$^2$ for H=1T and 11 kA/cm$^2$ for H=0.5 T. n* is the effective carrier concentration as defined hereinbefore. l*(H) is the effective ambipolar diffusion length such that excess electrons excited by the J×H force can move along the lines of force (the (−y)-direction) until the annihilation by recombination. The values of l*(H) can be estimated to be 2.0 $\mu$m, 1.2 $\mu$m and 0.8 $\mu$m, respectively, corresponding to the values of the magnetic fields of 0.5, 1 and 2 T. These values are considered to be reasonable when the magnetic field dependence of the recombination probability is taken into account.

Figure 4:
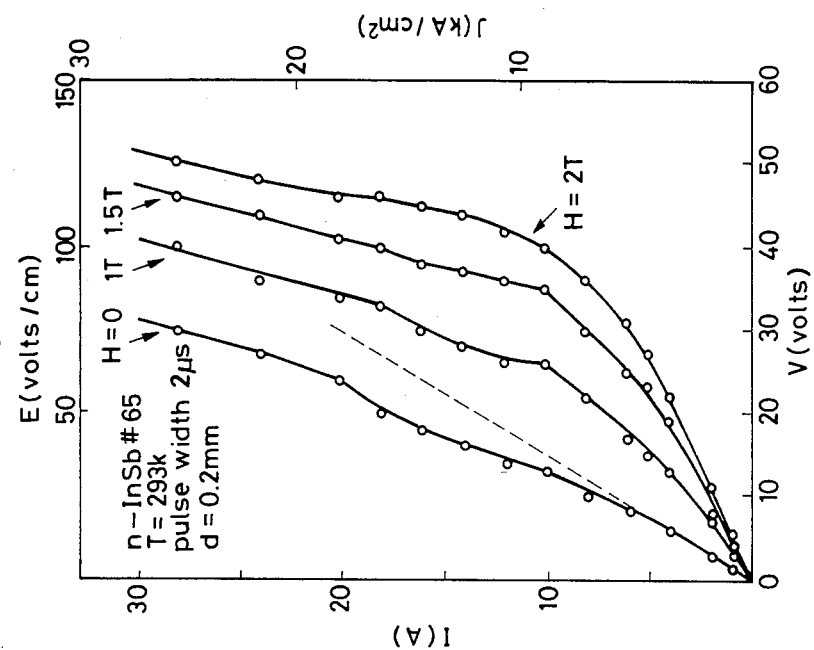
FIG. 4 is a graph showing the experimental results at 293 K of the current (I)—voltage (V) characteristics for H=0, 1.5 and 2 Tesla in an n-type InSb single-crystal sample, where J⊥H.

FIG. 4 is a graph showing the voltage-current characteristics at 293 K for given magnetic fields of H=0, 1, 1.5 and 2 T. In this case remarkable nonlinear characteristics in the V-I curves are still observed at high currents and high magnetic fields, indicating the remarkable increase in the carrier concentration through the interband breakthrough, although the negative resistance as seen at 80 K is not observed for this extent of magnetic fields.

As already mentioned, electrons and holes are driven toward the (−y)-direction by the J×H force when $n\sim P$. In this case, the Hall electric field becomes almost zero at high magnetic fields, and it may be considered that an effective electric field, E*, being equivalent to the J×H force and defined by the following equation;

$$E^* = \frac{JH}{n^* ec}, \qquad (43)$$

is induced along the transverse direction (// y - axis).

From the critical current density, the value of $E^*_c$ can be estimated. In the case of H=2T and $J_c=4.5$ kA/cm$^2$, the value of $E^*_c$ becomes as high as 4.9 kV/cm. However, in this case, the longitudinal electric field (the applied electric field // x-axis) is at most 550 V/cm. Then, the value of the effective electric field induced by the J×H force in the (−y)-direction is as high as $\sim 10$ times of the applied electric field (// the x-direction).

Thus, it will be understood that such a high electric field E* acting upon narrow—gap semiconductors, such as InSb ($E_g\sim 0.23$ ev), can easily cause the interband breakthrough, through which the carrier concentrations, n* and p*, are drastically increased. From the V-I characteristic of FIG. 3, the effective carrier concentration at 80 K is estimated as $1.8\times 10^{16}$ cm$^{-3}$ for H=2 T and J=30 kA/cm$^2$. Because the sample has the thermal equilibrium value of $n_0=1.0\times 10^{15}$ cm$^{-3}$ at 77 K, it seems that the carrier concentration is increased by a factor of 20. Although the carrier concentration is fairly higher than $n_0$, it may give an impression that the increase in carrier concentration is not high enough as expected.

While, the present inventor has succeeded in lasing for 5.3 $\mu$m radiation in an InSb single-crystal using the population inversion on the basis of the principle as set forth hereunto. The observed waveform of the laser emission, having a series of spike-like emissions, indicates that almost instantaneous excitation by the J×H force and the subsequent relaxation accompanied with recombination emission are alternately repeated with a short period. Thus, we may say that the value of n* estimated above is not the peak value at the excitation, but an average value during the excitation and the relaxation processes. Accordingly, the above value of carrier concentration n* is rather under-estimated, and the peak value is expected to increase up to the hundreds of times of the quoted value, and hence enough inverted population is actually realized.

The relationships between the current I and the phase-shift δ (degrees/cm), for given values of H, were measured at 80 and 293 K using the same InSb sample. As the incident light a CO$_2$ laser light with a wavelength 10.6 $\mu$m was utilized. The graph in FIG. 5 shows the experimental results at 293 K. The lower abscissa is the current I, and the upper abscissa is the current density J. The ordinate is the phase-shift per unit path, δ. The value of δ sharply increases with the increasing J at high currents.

In the case of H=1T, the phase-shift, δ, per unit path is 38°/cm at I=0 and is constant up to I=3 A. It then linearly increases to 100°/cm for I=25 A. In the case of H=1.5 T, the phase-shift, δ, per unit path is 87°/cm at I=0 and increases to 238°/cm for I=25 A. In the case of H=2 T, the value of δ is 152°/cm at I=0 and increases up to 426°/cm for I=25 A. The three curves show a similar tendency in agreement with equation (41), therein δ is proportional to the square of H and the effect of J is implicitly included in n*.

Here, it is to noted that the phase-shift δ can be increased additively by repeatedly passing the light through the sample by means of the multiple reflection at the surfaces, for example. This elongation of the passage will enhance the utility in practical use.

FIG. 6 shows the experimental results of the I-δ characteristics at 80 K. It is seen that δ is proportional to the square of H, and the value of δ increases almost exponentially with the increasing J at high currents. However, the value of the phase-shift δ is small compared with the value at 293 K, reflecting that the values of the effective carrier concentration n* and p* are smaller at 80 K than at 293 K.

The band-gap energy, $E_g$, of InSb crystals is 0.23 eV. While, the photon energy, $n\omega$, of the $CO_2$ laser of a wavelength 10.6 μm is about 0.11 eV and the energy $n\omega_p$ of the plasmon is in the order of one tenth of $E_g$. Then, the 10.6 μm radiation of the $CO_2$ laser satisfies inequality (31), and hence it can propagate through the InSb crystal without absorption. As long as the electron-hole system is nondegenerate the light having an energy $n\omega > E_g$ can not propagate freely without absorption through the materials. However, this is not correct when the electron-hole system becomes degenerate, since then light amplification occurs for photons satisfying the following inequality (44) by means of the stimulated emission resulting from the population inversion, as shown in FIG. 2, produced by the J×H force;

$$E_{F1} - E_{F2} > n\omega > E_g, \quad (44)$$

where $E_{F1}$ is the quasi Fermi level of electrons, and $E_{F2}$ is the quasi Fermi level of positive holes.

The light of a wavelength satisfying the relation (44) is the subject to the amplification by the stimulated emission as well as the phase-shift. Accordingly, the present invention can be applicable not only to the frequency range satisfying the inequality (31), but also to the range expressed by (44). The amplification factor depends on the current density J, and the phase-shift δ depends on the current density J. Accordingly, when the amplification is taking place the relationship between δ and J will deviate from the relationship as shown in FIG. 5 or FIG. 6. However, this is not a problem, since the two effects (amplification and phase-shift) are automatically multiplied so that the multiplied effect appears in the output of the modulator and it is advantageous for the modulation of weak light. The relationship between J and δ can still be uniquely determined from the measured values.

Figure 7:
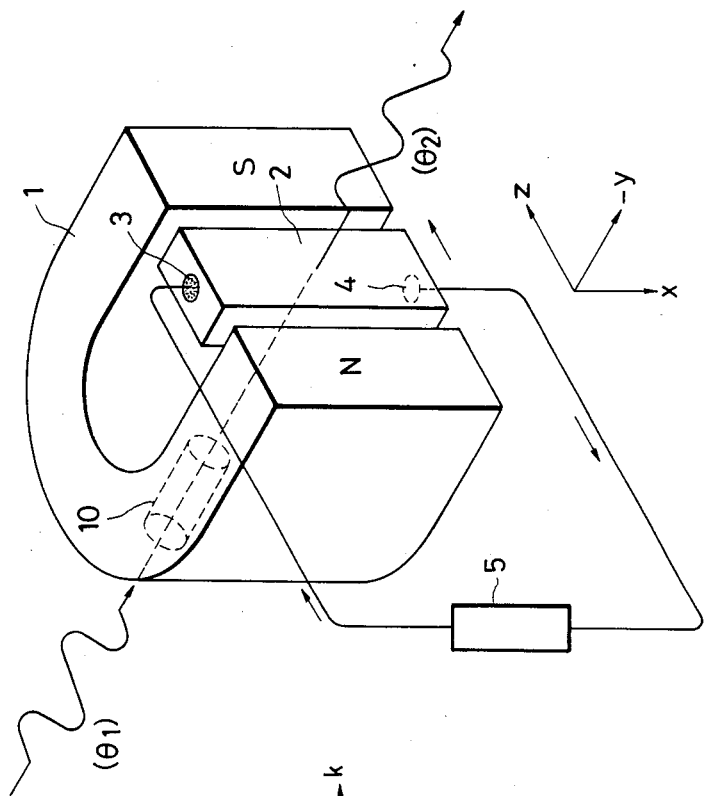
FIG. 7 is a schematic view showing the constructed magneto-electro-optic effect light modulator.

The principle of the present invention is shown in FIG. 1. The construction of the present invention will be described with reference to FIG. 7. A permanent magnet 1 is a magnet which generates a strong magnetic field equal to or higher than 1 Tesla. Alternatively, permanent magnet 1 may be replaced by an electromagnet. A plate-like semiconductor element 2 is disposed between the magnetic poles of permanent magnet 1.

In order to pass a current perpendicularly to the magnetic field, electrodes 3 and 4 are attached to both ends of semiconductor element 2. A power source 5 is connected to electrodes 3 and 4 through a lead wire.

Power source 5 provides both DC biased current and modulated current. Infrared "incident light" impinges upon a surface of the semiconductor element, which is parallel to both the magnetic field and the current.

Transmitted light is emitted from the opposite surface of the semiconductor. A hole 10 functions as the passage for light and is provided in permanent magnet 1. Because the magnet shown in the drawing is U-shaped, it is necessary to provide the hole 10 for the passage of light. If the magnet is set up differently, the hole 10 is not always needed.

Let $\theta_1$ be the angle of the plane of polarization of the incident light with respect to H and $\theta_2$ be that of the transmitted light, then generally it follows that $\theta_1 \neq \theta_2$. The difference between the both angles $(\theta_1 - \theta_2)$ can be controlled by the values of current J and magnetic field H. By use of a couple of polarizers the rotation of the plane of polarization can be picked up so as to change the intensity of the transmitted light.

As described above, a light modulator can be constructed so as to operate at room temperature.

TABLE 1

Semiconductors suitable for magneto-electro-optic effect light modulator according to the present invention

| SEMI-CONDUCTOR | MIXTURE RATIO | BAND-GAP ENERGY (eV) | WAVE-LENGTH (μm) |
|---|---|---|---|
| InSb | | 0.23 | 5.3 |
| InAs | | 0.36 | 3.4 |
| $Hg_{1-x}Cd_xTe$ | $0.15 < x \leq 0.5$ | | |
| | x = 0.15 | >0 | — |
| | x = 0.2 | 0.1 | 12.4 |
| | x = 0.4 | 0.5 | 2.5 |
| | x = 0.5 | 0.6 | 2.1 |
| $Pb_{1-x}Sn_xTe$ | $0 \leq x \leq 1$ | | |
| | x = 0.4 | 0 | — |
| | x = 0 | 0.18 | 6.9 |
| | x = 1 | 0.3 | 4.1 |
| $Pb_{1-x}Sn_xSe$ | $0 \leq x \leq 0.5$ | | |
| | x = 0 | 0.26 | 4.8 |

The light modulator can also be used at liquid-nitrogen temperature (77 K), or at liquid-helium temperature (4.2 K). The examples of the materials for the semiconductor element available for the light modulator include InSb, InAs, HgCdTe, PbSnTe, PbSnSe, and so on. The latter three materials are mixed crystals and the band-gaps for each semiconductor materials and the wavelengths corresponding to the band-gaps are shown in Table 1.

By using various kinds of semiconductors respectively having different values of band-gap, the phase-shift for a light over a wide range of wavelengths can be arbitrarily controlled by the value of current J being passed through the element. By the suitable combination of semiconductor element and polarizer, intensity modulation can be made for light signal.

Figure 8:
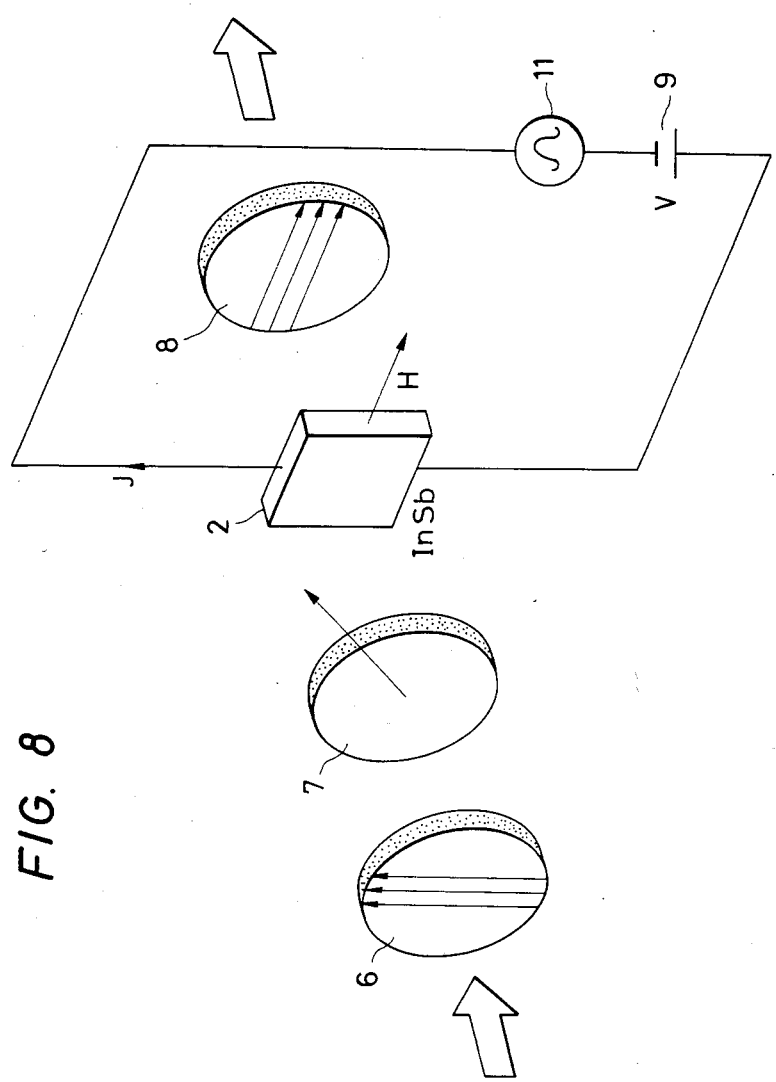
FIG. 8 shows an arrangement of the infrared-light modulator according to the present invention using a bulky InSb crystal.

An infrared-light-modulator using InSb according to the present invention will be described with reference to FIG. 8. A semiconductor element 2 of plate-like body shaped from an InSb single-crystal is used. In the drawing, a current J is provided to flow upward from a power source 5. A strong magnetic field H is applied in the direction perpendicular to the current J. (The magnet is not shown in the drawing). Incident light is a $CO_2$ laser light having a wavelength of 10.6 μm. The incident light is linearly polarized by an entrance polarizer 6. If the incident light is linearly polarized, no entrance polarizer 6 is needed. The plane of polarization is rotated by 45 degrees using a quarter-wavelength phase-shifter.

The light is incident upon the semiconductor element 2 and passes through it. Power source 5 contains a DC biased power source 9 and an electric modulator 11. The power source 5 provides a current controlled so as to be totally positive but partly modulated. By transmitting through the semiconductor element 2, the plane of polarization of the incident light is rotated and the transmitted light passes again through the exit polarizer 8.

The plane of polarization of the exit polarizer 8 is set up to be perpendicular to that of entrance polarizer 6. If the plane of polarization is not rotated in InSb semiconductor element 2, the plane of polarization of light passed through the quater-wavelength phase-shifter 7 and the plane of polarization of exit polarizer 8 makes an angle of 45 degrees. In this case, the value of transmittance of the light is 50%.

Now, by passing the DC biased current through the semiconductor element 2, the plane of polarization of the transmitted light is rotated to either plus or minus side. Accordingly, the value of transmittance of light is shifted from 50% to either ± side, and the shift quantity covers about ±20%. In this way, the working level for the intensity of the transmitted light and the working point for the polarization angle are set up. By superposing, a modulated current J' to the DC biased current, the polarization angle is rotated from its working point. Thus, the transmittance of light is changed so that the intensity of the transmitted light increases or decreases, and hence the intensity modulation of light is achieved.

The quarter-wavelength phase-shifter 7 may be omitted. Then, the intensity modulation of light may be made by use of only a DC biased current. In this case, it is required that the polarization axes of the exit polarizer 8 and the entrance polarizer 6 are set up to make an angle of about 45 degrees each other.

Thus, according to the present invention, the intensity modulation of infrared-light is feasible. The light modulator according to the present invention can be used as a modulator for optical wireless communications using a $CO_2$ laser light. The present invention is not limited to the above-described embodiment; other modifications are also possible, for example, it is possible to perform the light modulation by use of a current modulated at audio frequencies; by which an infrared-wireless communication system can be composed.

What is claimed is:

1. A magneto-electro-optic effect light modulator for effecting a desired phase and an intensity modulation of infrared light incident upon a semiconductor having an energy gap transparent for the incident light, said modulator utilizing the population inversion caused by an action of the Lorentz force comprising:

a rectangular solid-like semiconductor element made of one member selected from the group consisting of an n-type semiconductor, a p-type semiconductor and an intrinsic semiconductor, said semiconductor element having no pn-junction and having a band-gap being related to the energy of the incident infrared-light;

a magnet for applying a magnetic field H to said semiconductor element;

electrodes for passing an electric current in said semiconductor element across the magnetic field;

a power source for passing an electric current proportional to the modulation desired through said electrodes said current effecting a phase and intensity modulation of the incident infrared light;

an entrance polarizer disposed in front of said semiconductor element for linearly polarizing infrared-light passing through said entrance polarizer; and an exit polarizer disposed behind said semiconductor element for linearly polarizing the transmitted infrared-light, passing through said exit polarizer, said exit polarizer having a polarization plane different from said entrance polarizer.

2. A magneto-electro-optic effect light modulator according to claim 1, wherein said semiconductor element is a crystal of InSb.

3. A magneto-electro-optic effect light modulator according to claim 1, wherein said semiconductor element is a crystal of InAs.

4. A magneto-electro-optic effect light modulator according to claim 1, wherein said semiconductor element is a mixed crystal of $Hg_{1-x}Cd_xTe$ and wherein X is in the range $0.15 > x \leq 0.5$.

5. A magneto-electro-optic effect light modulator according to claim 1, wherein said semiconductor element is a mixed crystal of $Pb_{1-x}Sn_xTe$ and wherein X is in the range $0 \leq x \leq 1$.

6. A magneto-electro-optic effect light modulator according to claim 1, wherein said semiconductor element is a mixed crystal of $Pb_{1-x}Sn_xSe$ and wherein x is in the range $0 \leq x \leq 0.5$.

* * * * *